(12) United States Patent
Hung

(10) Patent No.: US 10,279,205 B2
(45) Date of Patent: May 7, 2019

(54) FALL PROTECTION DEVICE

(71) Applicant: YOKE INDUSTRIAL CORP., Taichung (TW)

(72) Inventor: Wei-Chieh Hung, Taichung (TW)

(73) Assignee: YOKE INDUSTRIAL CORP., Taichung (TW)

(*) Notice: Subject to any disclaimer, the term of this patent is extended or adjusted under 35 U.S.C. 154(b) by 55 days.

(21) Appl. No.: 15/599,907

(22) Filed: May 19, 2017

(65) Prior Publication Data
US 2018/0333598 A1   Nov. 22, 2018

(51) Int. Cl.
*A62B 35/00*  (2006.01)
*F16D 49/04*  (2006.01)
*F16D 59/02*  (2006.01)
*A62B 1/10*   (2006.01)

(52) U.S. Cl.
CPC ...... *A62B 35/0075* (2013.01); *A62B 35/0093* (2013.01); *F16D 49/04* (2013.01); *F16D 59/02* (2013.01); *A62B 1/10* (2013.01)

(58) Field of Classification Search
CPC ..... F16D 59/02; F16D 59/00; A62B 35/0075; A62B 1/14
See application file for complete search history.

(56) References Cited

U.S. PATENT DOCUMENTS 1,670,734 A * 5/1928 Moore ...................... B66D 3/22
                                                                14/23
3,879,016 A * 4/1975 Kankkunen ............. A62B 1/10
                                                                182/238
5,829,548 A * 11/1998 Ostrobrod ................. E06C 7/18
                                                                182/18

(Continued)

FOREIGN PATENT DOCUMENTS

CN   204815443 U   12/2015
TW   M540390 U    4/2013

(Continued)

OTHER PUBLICATIONS

Examination Report for TW106111694, dated Mar. 5, 2018, Total of 2 pages.

(Continued)

*Primary Examiner* — Bradley T King
*Assistant Examiner* — James K Hsiao
(74) *Attorney, Agent, or Firm* — Lynette Wylie; Apex Juris, pllc.

(57) ABSTRACT

A fall protection device including a first housing part, a second housing part, a rotation unit, a safety belt, a spiral spring for coiling the safety belt around the rotation unit and a brake unit for limiting rotation of the rotation unit is disclosed. The first and the second housing parts respectively include a first containing room and a second containing room. The first and the second housing parts conjugate with each other and constitute a housing. The brake unit is positioned in the first containing rooms, while part of the safety belt and the spiral spring are positioned in the second containing rooms. By separately positioning the brake unit and the safety belt in the first and the second rooms, the dust coiled together with the safety belt into the housing will not adhere to the brake unit and its effect on the brake unit's function is prevented.

5 Claims, 4 Drawing Sheets

(56) References Cited

U.S. PATENT DOCUMENTS

| | | | | |
|---|---|---|---|---|
| 8,251,176 B2* | 8/2012 | Meillet | ................... | A62B 1/08 |
| | | | | 182/230 |
| 2010/0226748 A1* | 9/2010 | Wolner | .............. | A62B 35/0093 |
| | | | | 414/815 |
| 2011/0100755 A1* | 5/2011 | Meillet | ................... | A62B 1/10 |
| | | | | 182/234 |
| 2013/0105247 A1* | 5/2013 | Casebolt | ................. | A62B 1/10 |
| | | | | 182/241 |

FOREIGN PATENT DOCUMENTS

| | | |
|---|---|---|
| TW | M531292 U | 11/2016 |
| TW | M547398 U | 8/2017 |

OTHER PUBLICATIONS

Search Report for TW106111694, dated Mar. 5, 2018, Total of 1 page.
English Abstract for CN204815443 (U), Total of 1 page.
English Abstract for TWM450390 (U), Total of 1 page.
English Abstract for TWM531292 (U), Total of 1 page.
English Abstract for TWM547398 (U), Total of 1 page.

\* cited by examiner

FALL PROTECTION DEVICE

BACKGROUND OF THE INVENTION

1. Technical Field

The present invention is related to a fall protection device, and more particularly to a fall protection device adapted to use in an elevated work site.

2. Description of Related Art

Due to the high-rise nature of the building construction nowadays, the building cleaning workers or painting workers involve in a more dangerous situation while their working site is getting higher. Therefore, the workers usually wear a fall protection device including a safety belt when they work at an elevated site. Wherein, the fall protection device is secured to a support, and one end of the safety belt is fastened to the worker. The fall protection device is used to prevent the workers continue to fall or to slow down the falling speed of the worker to secure the safety of the workers.

Conventional fall protection devices include a rotation unit, a spiral spring, a brake unit, and a safety belt. Wherein, the brake unit is positioned on the rotation unit to limit the rotation of the rotation unit; one end of the safety belt is connected to the rotation unit, and the safety belt is wound around the rotation unit; and an inner end of the spiral spring is connected to the rotation unit, and is adapted to wind the safety belt around the rotation unit. While the workers are working, the spiral spring, the brake unit and the rotation unit rotate co-axially such that a length of the safety belt can be adjusted. When the workers fall from their elevated site carelessly, the brake unit can stop the rotation unit rotating immediately to prevent the workers continue to drop.

However, the working site of the building in construction is usually full of dust. The dust easily adheres to the brake unit of the fall protection device and decreases the stop function of the brake unit, such that the danger to the workers is increased.

In order to reduce the effect of the dust adhering to the fall protection device, a modified fall protection device is disclosed. The modified fall protection device includes a housing with a front cover and a back cover which conjugate with each other to isolate the dust from the housing. However, the effect is still very limited. The dust of the working site still adheres to the safety belt exposed outside of the housing, and the dust is coiled into the housing together with the safety belt. Then, the dust adheres to the braking unit again and decreases the function of the fall protection device.

BRIEF SUMMARY OF THE INVENTION

In view of the above, the purpose of the present invention is to provide a fall protection device which can reduce the effect of the dust on the stop function and the buffer function of the fall protection device.

The present invention provides a fall protection device including a first housing part, a second housing part, a rotation unit, a spiral spring, a brake unit and a safety belt. Wherein, the first housing part and the second housing part conjugate with each other and constitute a housing; the housing includes a through hole which communicates an inside of the housing to an outside of the housing; the rotation unit, the spiral spring and the brake unit are positioned in the housing; an inner end of the spiral spring is connected with the rotation unit to keep the safety belt being wound around the rotation unit; the brake unit is adapted to limit a rotation of the rotation unit; one end of the safety belt is connected to the rotation unit; the safety belt can be rotated together with the rotation unit and is wound around the rotation unit; and the other end of the safety belt penetrates through the through hole. The fall protection device is characterized in that: each of the first housing part and the second housing part includes a first containing room, a second containing room, an opening, an exterior butt face and an interior butt face; wherein the exterior butt faces are positioned on edges of the openings, and the interior butt faces are positioned between the first containing rooms and the second containing rooms; the first housing part and the second housing part conjugate with each other via the opening, such that the exterior butt faces and the interior butt faces positioned inside of the first housing part and the second housing part are conjugated with each other; and the brake unit is positioned in the first containing rooms of the first housing part and the second housing part, and part of the safety belt and the spiral spring are positioned in the second containing rooms of the first housing part and the second housing part.

The advantage of the present invention is that each of the first housing part and the second housing part includes the first containing room and the second containing room, such that the brake unit and the safety belt are respectively positioned in the first containing rooms and the second containing rooms. Then, the dust adhered to the safety belt will not adhere to the brake unit when it is wound together with the safety belt.

DETAILED DESCRIPTION OF THE INVENTION

Figure 1:
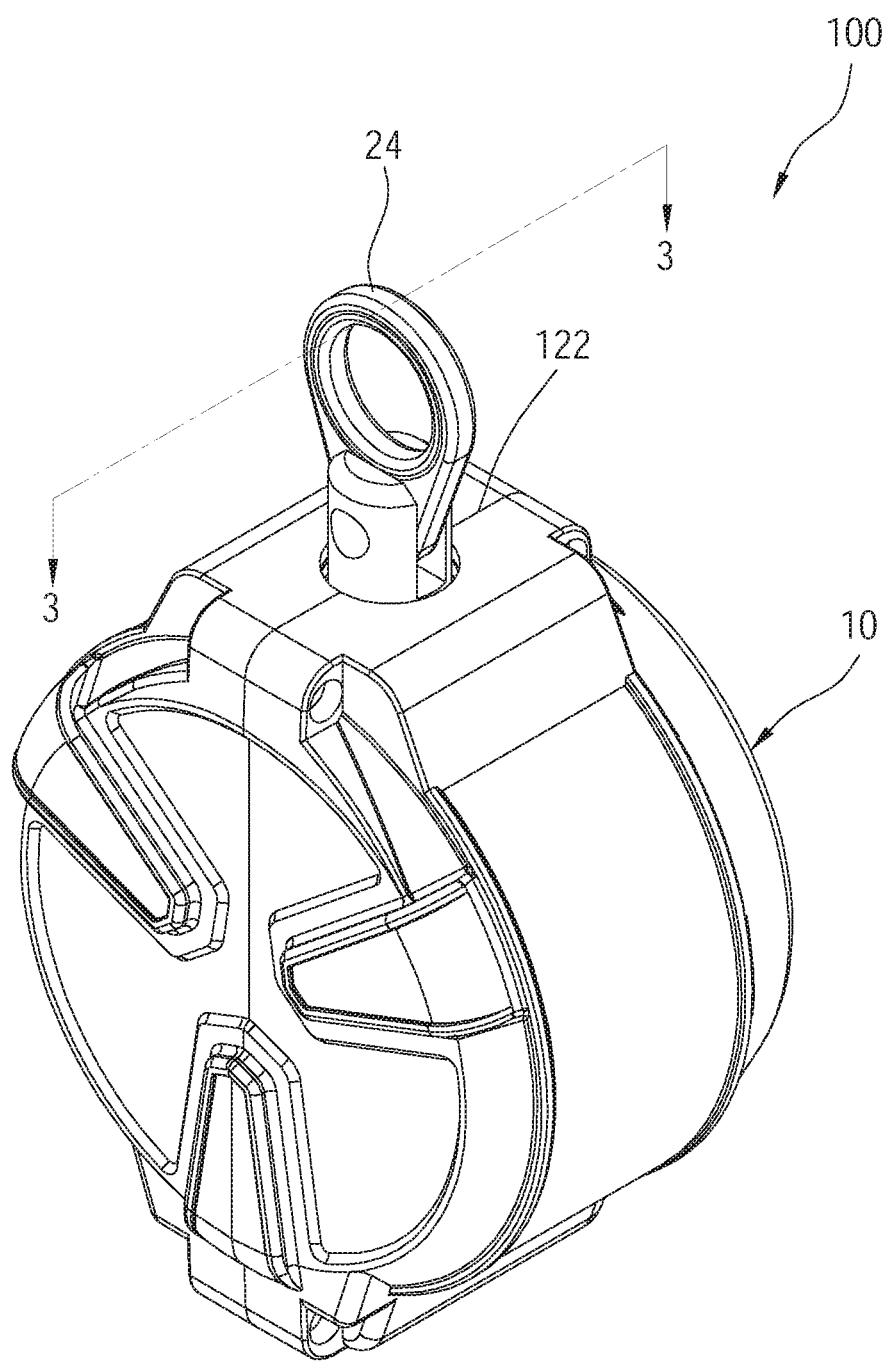
FIG. 1 is a perspective view of a fall protection device of an embodiment according to the present invention.
Figure 3:
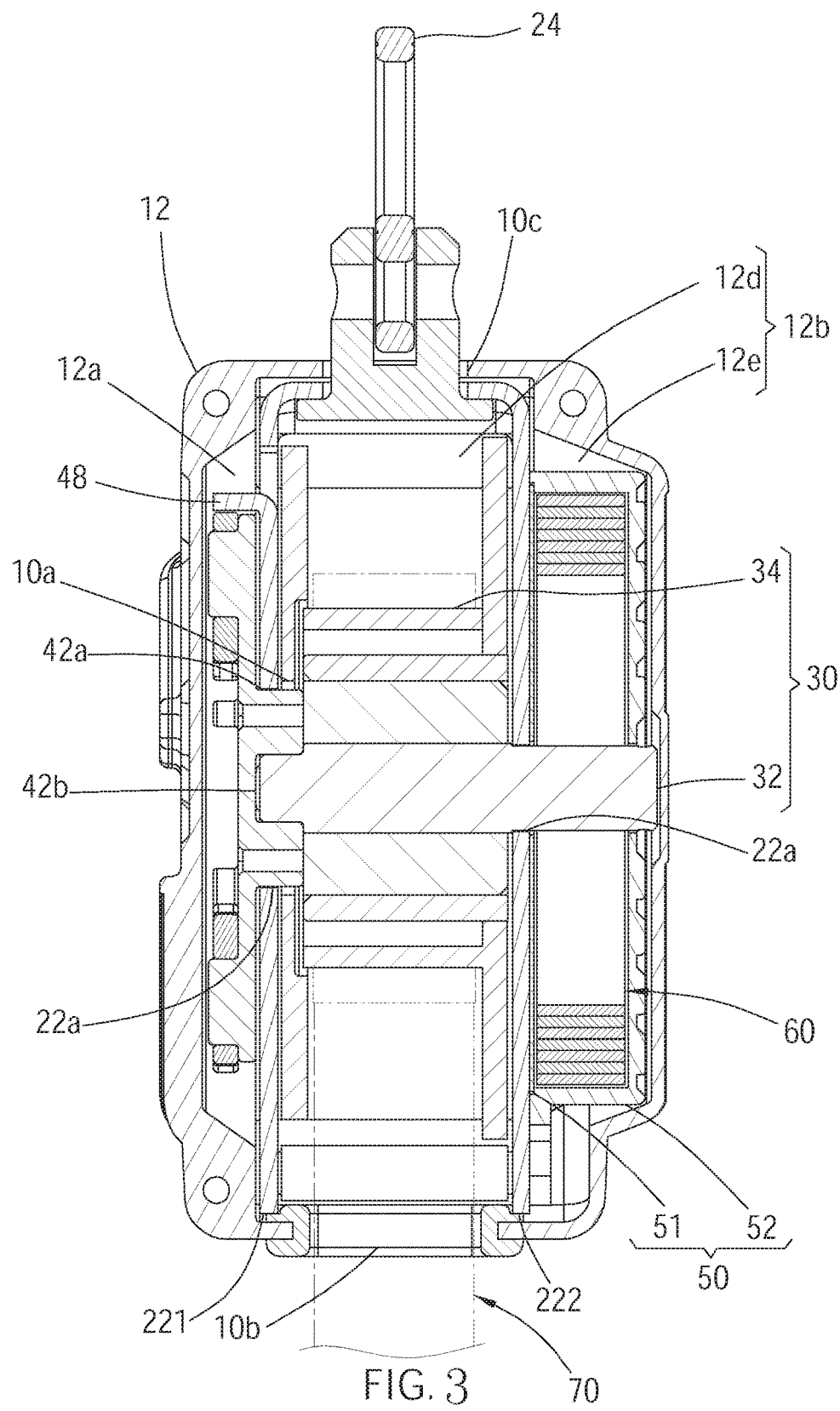
FIG. 3 is a cross-sectional view of the fall protection device of the above embodiment.

As shown in FIG. 1 and FIG. 3, a fall protection device 100 of an embodiment according to the present invention which is used to prevent workers continue to fall when they fall or slip from their elevated work site is illustrated. The fall protection device 100 includes a first housing part 12 and a second housing part 12'. The first housing part 12 and the second housing part 12' conjugate with each other to constitute a housing 10, and are fixed together with three bolts S. The fall protection device 100 further includes a frame 20, a rotation unit 30, a brake unit 40, a boxing 50, a spiral spring 60 and a safety belt 70 which are positioned inside the housing 10.

Figure 2:
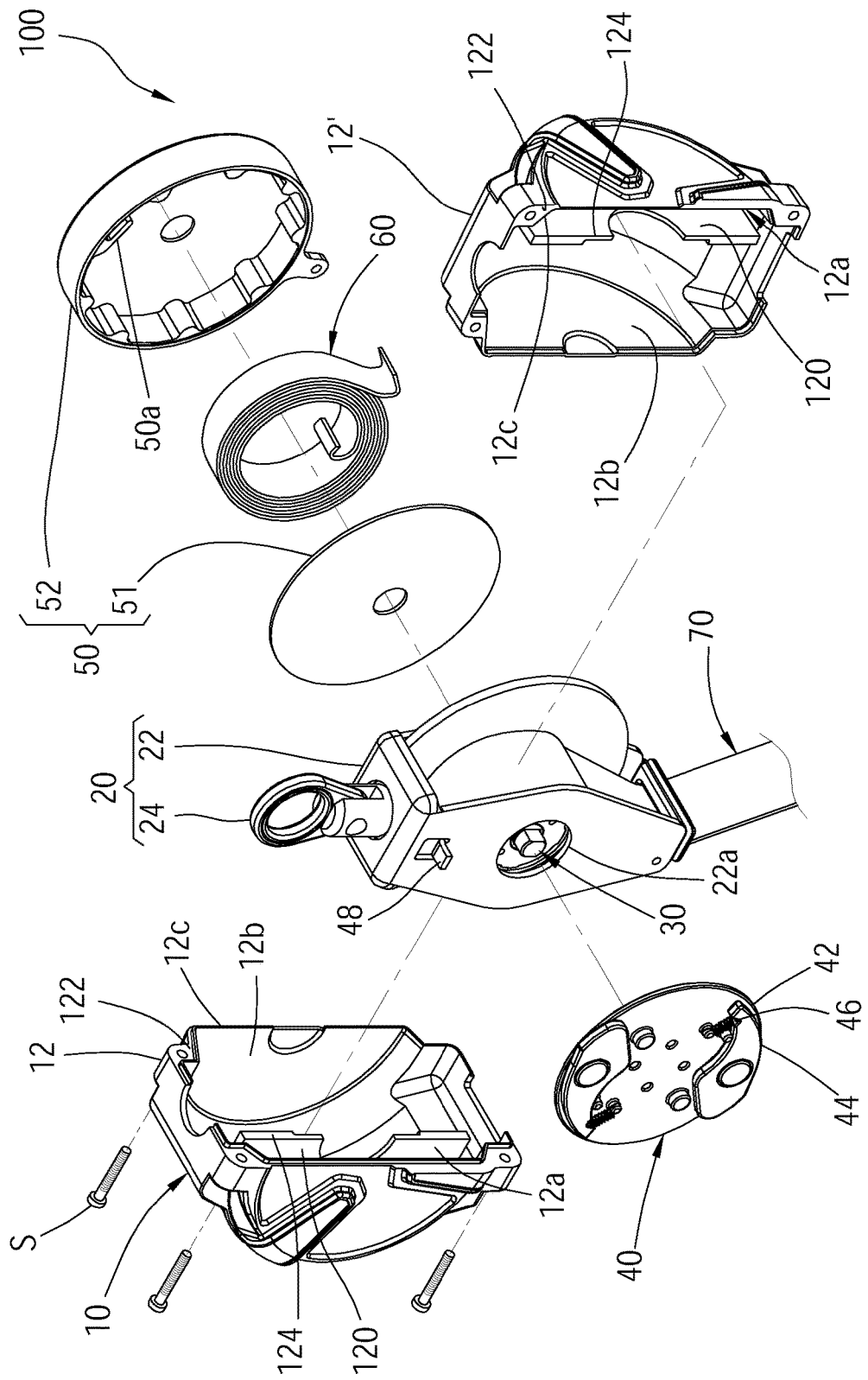
FIG. 2 is an exploded view of the fall protection device of the above embodiment.
Figure 4:
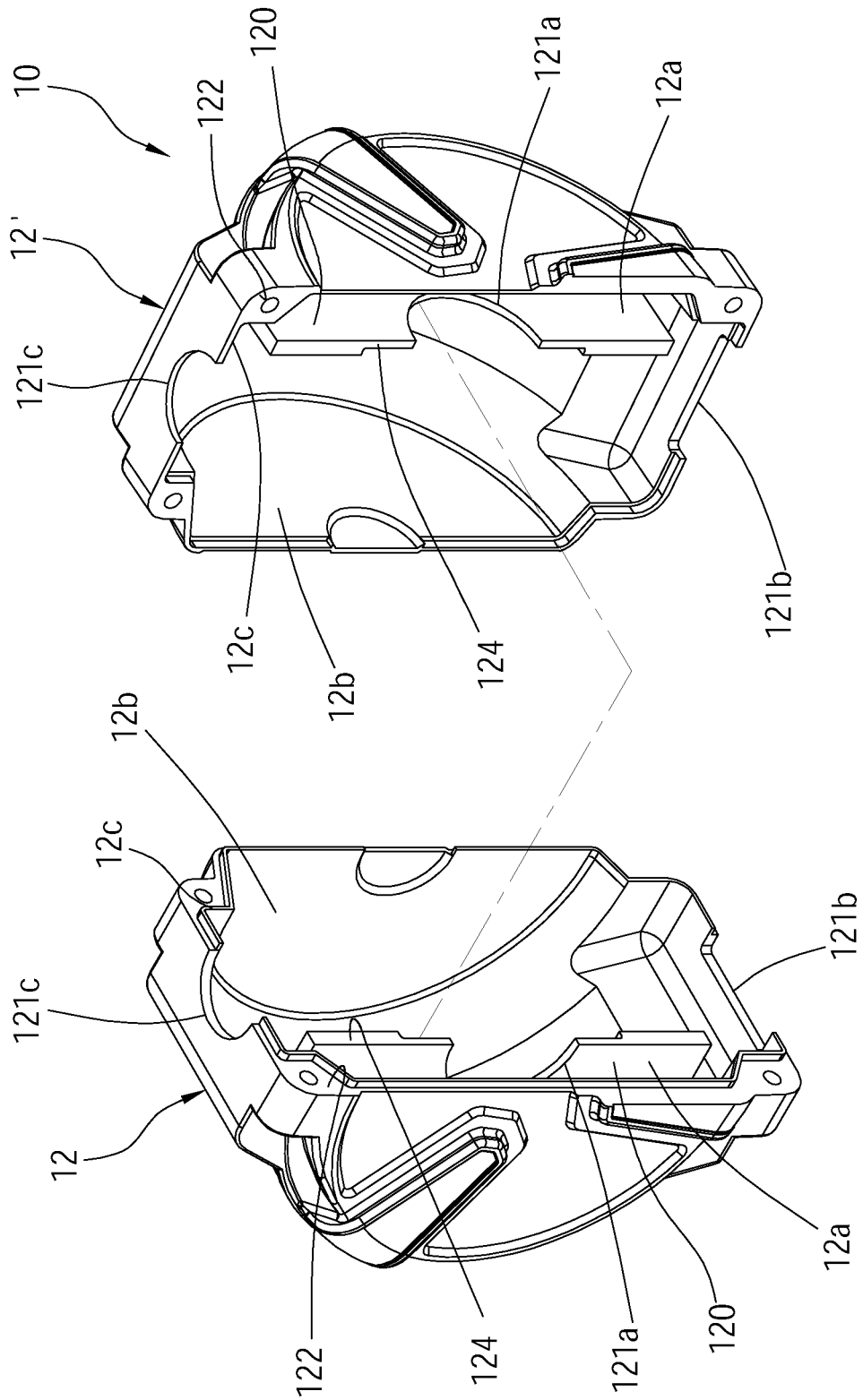
FIG. 4 is a perspective view of part of the components of the fall protection device of the above embodiment.

As shown in FIG. 2 and FIG. 4, each of the first housing part 12 and the second housing part 12' includes a first containing room 12a, a second containing room 12b, an opening 12c, an exterior butt face 122, and an interior butt face 124. Wherein, the exterior butt face 122 is positioned at the edge of the opening 12c, and the interior butt face 124 is positioned between the first containing room 12a and the second containing room 12b. The first housing part 12 and the the second housing part 12' conjugated with each other via the openings 12c, while the exterior butt faces 122 as well as the interior butt faces 124 positioned inside the first and the second housing parts 12, 12' are conjugated with each other respectively. The brake unit 40 is positioned in the first containing rooms 12a of the first and the second housing parts 12, 12'. Part of the safety belt 70 and the spiral spring 60 are positioned in the second containing rooms 12b of the first and the second housing parts 12, 12'.

Each of the first housing part 12 and the second housing part 12' includes three notches, and each notch of the first housing part 12 includes a contour matching to one notch of the second housing part 12'. The three notches include a first notch 121a, a second notch 121b and a third notch 121c. Wherein, the first containing room 12a communicates with the second containing room 12b via each of the first notches 121a. The pair of the first notches 121a constitute a channel 10a when the first housing part 12 and the second housing part 12' conjugate with each other. Besides, the pair of the second notches 121b and the pair of the third notches 121c respectively constitute a first through hole 10b and a second through hole 10c when the first housing part 12 and the second housing part 12' conjugate with each other. The interior of the housing 10 communicates with the outside via the first through hole 10b and the second through hole 10c.

The frame 20 includes a frame body 22 and a hanging ring 24 connected to a top portion of the frame body. The frame body 22 includes a first part 221 and a second part 222 which are facing each other. Each of the first part 221 and the second part 222 includes a hole 22a corresponding to the channel. The first part 221 is positioned in the first containing rooms 12a of the first housing part 12 and the second housing part 12'. The second part 222 is positioned in the second containing rooms 12b of the first housing part 12 and the second housing part 12'. Each of the second containing rooms 12b is divided into a first space 12d and a second space 12e by the second part 222. Wherein, for each of the first and the second housing parts 12, 12', the first space 12d is positioned between the first containing room 12a and the second space 12e, and the first space 12d communicates to the outside via the first through hole 10b.

The hanging ring 24 penetrates through the second through hole 10c constituted by the third notches of the first and the second housing parts 12, 12'. The hanging ring 24 is used to hang or fix the fall protection device 100 to a secure support, for example, a cable.

The rotation unit 30 includes a shaft 32 and a rotary drum 34. Wherein, each of the two terminals of the shaft 32 respectively penetrates through each of the two holes 22a of the frame 20. The rotary drum 34 is mounted on the shaft 32 and can be co-axially rotated with the shaft 32. The rotary drum 34 is positioned in the first spaces 12d and is used for rolling up the safety belt 70.

The brake unit 40 is positioned in the first containing rooms 12a and includes a braking plate 42, two braking parts 44, two restoring spring 46 and a stopper 48. Wherein, the braking plate 42 includes a protrusion part 42a penetrating through the hole 22a of the first part 221 and the channel. The protrusion part 42a includes a recess 42b matching with the shaft 32 of the rotation unit 30. The shaft 32 fits to the recess 42b, such that the rotation unit 30 and the braking plate 42 can rotate co-axially. Each of the braking parts 44 is pivotally connected to the braking plate 42, and each of the restoring springs 44 is respectively connected to one of the braking parts 44. The restoring springs 46 are used to provide an elastic force adapted for inward moving and positioning the braking parts 44. That is, the braking parts 44 are dragged and positioned by the elastic force of the restoring springs 46. The stopper 48 is positioned on the first part 221 and is adapted for one of the braking parts 44 to abut on when the braking part 44 overcomes the elastic force of the restoring spring 46 and spins out.

The boxing 50 is positioned in the second space 12e, and is connected with the second part 222 of the frame 20. The boxing 50 includes a first cover 51 and a second cover 52. A containing space 50a is positioned between the first cover 51 and the second cover 52, and is adapted for containing the spiral spring 60.

An inner end of the spiral spring 60 is connected with the rotation unit 30, while an outer end of the spiral spring 60 is connected with the boxing (not shown). The spiral spring 46 tends to coil as a roll normally.

One end of the safety belt 70 is connected with the rotary drum 34 and the safety belt 70 can be wound around the rotary drum 34 by rotating the rotation unit 30. The other end of the safety belt 70 penetrates through the first through hole 10b and is fastened to the body of the worker.

In operating the fall protection device 100, the safety belt 70 is fastened to the body of the worker, and the hanging ring 24 of the fall protection device 100 is hung or fixed to a secure support. By the design of the above structure, under a condition that the worker works normally and does not fall, the rotation unit 30, and braking plate 42 and the spiral spring 60 can rotate co-axially. Meanwhile, the spiral spring 60 can store a restoring force for coiling by its deformation stretched by the safety belt 70. When a stretching force applying to the safety belt 70 is greater than the restoring force of the spiral spring 60, for example, the worker is away from the housing 10, the safety belt 70 can be pulled out easily. On the other hand, when the stretching force applying to the safety belt 70 is smaller than the restoring force of the spiral spring 60, for example, the worker is approaching to housing 10, the elastic force of the spiral spring 60 can drive the safety belt 70 to coil around the rotary drum 34 again so as to keep the safety belt 70 wound around the rotary drum 34.

When the worker carelessly falls from an elevated site, the safety belt 70 is pulled out rapidly and rotates the rotation unit 30 and the braking plate 42 quickly. Then, the braking parts 44 are driven by a centrifugal force which overcomes the elastic force of the restoring spring 46 and is spun out. At this point, one of the braking parts 44 will abut on the stopper 48. Meanwhile, the braking plate 42 can stop rotating since the braking part 44 is limited by the stopper 48. Whereby, the purpose of stopping the rotation of the rotation unit 30 is achieved, and the pulled-out length of the safety belt 70 can be fixed so as to prevent the worker continue to fall.

Since the brake unit 40 and the rotary drum 34 for rolling the safety belt 70 are separately positioned in the first containing rooms 12a and the second containing rooms 12b of the first housing part 12 and the second housing part 12', the dust comes from the working environment is limited in the second containing rooms 12b and will not adhere to the brake unit 40 positioned in the first containing rooms 12a, even though the dust adhered to the safety belt 70 is coiled together with the safety belt 70 into the housing 10. It can prevent the dust from interfering the braking unit 40's function of limiting the rotation unit 30 from rotation, and can secure the safety of the workers. Besides, the spiral spring 60 is also contained in the containing space 50a of the boxing 50 and is also isolated from the dust. It can prevent the dust from adhering to the spiral spring 60 and affecting the deformation and the restoring force of the spiral spring 60.

It must be pointed out that the embodiments described above are only some embodiments of the present invention. All equivalent structures which employ the concepts disclosed in this specification and the appended claims should fall within the scope of the present invention.

What is claimed is:

1. A fall protection device, comprising a first housing part, a second housing part, a rotation unit, a spiral spring, a brake unit and a safety belt; wherein the first housing part and the second housing part conjugate with each other to constitute a housing, and the housing comprises a through hole communicating an inside of the housing with an outside of the housing; the rotation unit, the spiral spring and the brake unit are positioned in the housing; an inner end of the spiral spring is connected with the rotation unit to keep the safety belt being wound around the rotation unit; the brake unit is adapted to limit a rotation of the rotation unit; one end of the safety belt is connected to the rotation unit; the safety belt can be rotated together with the rotation unit and is wound around the rotation unit; and another end of the safety belt penetrates through the through hole; the brake unit includes a braking plate and two braking parts; the fall protection device is characterized in that:

each of the first housing part and the second housing part comprises a first containing room, a second containing room, an opening, a partition, an exterior butt face and an interior butt face, wherein the partition has the interior butt face, and is not rotatable; the exterior butt face is positioned on an edge of the opening, and the interior butt face is positioned between the first containing room and the second containing room;

the first housing part and the second housing part conjugate with each other via the openings thereof, such that the exterior butt faces and the interior butt faces inside of the first housing part and the second housing part are conjugated with each other, and each of the first containing rooms and the corresponding second containing room are seperated apart via the corresponding partition; and the brake unit is positioned in the first containing rooms of the first housing part and the second housing part, and part of the safety belt and the spiral spring are positioned in the second containing rooms of the first housing part and the second housing part.

2. The fall protection device of claim 1, wherein each of the first housing part and the second housing part comprises a notch positioned between the first containing room and the second containing room; contours of the notches of the first housing part and the second housing part are matching to each other; and the notches constitute a channel when the first housing part and the second housing part conjugate with each other.

3. The fall protection device of claim 2, wherein the brake unit comprises a protrusion part penetrating through the channel, and the protrusion part comprises a recess matching to the rotation unit.

4. The fall protection device of claim 2, further comprising a frame; wherein the frame comprises a first part and a second part; the first part is positioned in the first containing rooms of the first housing part and the second housing part; the second part is positioned in the second containing rooms of the first housing part and the second housing part and divides each of the second containing rooms into a first space and a second space; part of the safety belt is positioned in the first space; the spiral spring is positioned in the second space; and the first space communicates with the outside of the housing via the through hole of the housing.

5. The fall protection device of claim 4, wherein the brake unit comprises a braking plate; the braking plate comprises a protrusion part penetrating through the opening; the protrusion part comprises a recess matching to the rotation unit; and the rotation unit fits to the recess to drive the rotation unit and the braking plate rotate co-axially.

\* \* \* \* \*